United States Patent [19]
Fletcher et al.

[11] 3,971,940
[45] July 27, 1976

[54] DETECTOR ABSORPTIVITY MEASURING METHOD AND APPARATUS

[76] Inventors: James C. Fletcher, Administrator of the National Aeronautics and Space Administraton, with respect to an invention of; Ronald E. Sheets, Westminster, Calif.

[22] Filed: Mar. 19, 1975

[21] Appl. No.: 559,845

[52] U.S. Cl. .............................. 250/340; 250/353
[51] Int. Cl.² .......................................... G01J 1/00
[58] Field of Search .......... 250/338, 340, 347, 351, 250/353, 252, 349; 73/355 R, 355 EM

[56] References Cited
UNITED STATES PATENTS

| | | |
|---|---|---|
| 3,350,562 | 10/1967 | Flint..................................... 250/347 |
| 3,392,282 | 7/1968 | Astheimer............................ 250/351 |
| 3,794,838 | 2/1974 | Weiss et al........................... 250/351 |

*Primary Examiner*—Davis L. Willis
*Attorney, Agent, or Firm*—Howard J. Osborn; Wallace J. Nelson; John R. Manning

[57] ABSTRACT

A method and apparatus for measuring the absorptivity of a radiation detector by making the detector an integral part of a cavity radiometer. By substituting the detector for the surface of the cavity upon which the radiation first impinges a comparison is made between the quantity of radiation incident upon the detector and the quantity reflected from the detector. The difference between the two is a measurement of the amount of radiation absorbed by the detector.

10 Claims, 2 Drawing Figures

DETECTOR ABSORPTIVITY MEASURING METHOD AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates generally to radiation detectors and specifically to an apparatus and method for measuring the amount of impinging radiation which is reflected from the detector surface.

The absolute measurement of the radiation striking a detector depends upon what portion of that radiation is absorbed. If no radiation were reflected, the detector would react to the entire impinging radiation and its measurement would be an indication of the total radiant energy. However, all detectors cause some reflections and, to the extent that they do, the readings they yield are inaccurate. Since the reflectance and absorptivity of any material varies with the type of radiation to which it is subjected, it is imperative for accurate measurements to evaluate the absorptivity of such radiation detectors in regard to the particular radiation of interest.

The requirement is for a convenient system for calibration of radiation detectors to an accepted secondary standard so that measurements taken with such detectors may be adjusted to account for the radiation which is reflected from the surface of the detector and which has no effect on the reading given by the detector. Such a calibration must be applicable to the particular radiation for which the detector is used but need not be an absolute measurement. The specific requirement is that the calibration system yield a reading of the relationship of reflected or absorbed radiation to the total applied radiation which may then be applied to modify the output readings of the detector.

The present invention provides an accurate and convenient apparatus and method for the calibration of the absorptivity of radiation detectors which may be used for any type of radiation and with all detectors.

SUMMARY OF THE INVENTION

The present invention operates essentially on a substitution principle by which the total radiation to which the detector is subjected and the radiation which is reflected from the detector are compared to establish the portion of radiation actually absorbed by the detector and contributing to its reading. This comparison is accomplished by the use of a specially constructed cavity radiometer which acts as a standard of comparison to both the total incident radiation reflected from the detector.

The particular advantage of the invention is the capability of calibrating detectors at the same conditions that they will ultimately be used. The invention operates with the same radiation source and power levels that are used for later measurements, therefore eliminating any need for adapting of the results to different radiation frequencies or power levels.

The invention consists essentially of an optical system which focuses the radiant energy upon the detector, an energy absorbing cavity radiometer to measure the radiant energy, and the detector which is being calibrated for absorptivity. Any optical system may be used which accurately directs the radiant energy onto the detector so that no energy entering its cavity aperture impinges on any surface other than the detector. One example of such a system consists of a xenon arc lamp radiation source focused on a selectable aperture disc by an aluminized mirror. A condensor lens assembly with a magnification ratio of one images the energy passing through the aperture onto the active area of the detector being calibrated. The aperture discs of this optical system are changed to vary the size of the image falling upon the detector in order that the active area of the detector may be fully illuminated with energy, while no energy strikes beyond the active area of the detector, regardless of the size of the detector being tested.

The energy absorbing cavity radiometer is specially constructed to permit the substitution of the detector being calibrated or a conventional energy absorbing surface for what would otherwise be the integral internal surface of the cavity upon which radiant energy first impinges. When the radiant energy entering the cavity strikes the detector surface which has been substituted for the cavity internal surface, most of the energy will be absorbed by the detector to perform the detection function. However, since no detector is ideal, some energy will be reflected from the surface of the detector. This reflected energy will impinge on the other surfaces of the cavity radiometer, be converted to heat, and measured in the conventional manner by the functioning of the cavity radiometer.

Upon completion of the measurement of the reflected energy, the detector is removed from its position as one surface of the cavity radiometer and a thermally conducting energy absorbing cover surface is substituted for the detector, thus forming a complete conventional cavity radiometer. The light source and optical system are operated in the same manner as before, so that this radiometer is then used to measure the total incident energy that enters the radiometer. The difference between the total energy entering the radiometer and the energy reflected from the detector is a measure of the energy the detector absorbs, and may be used to correct the readings of the detector to account for the energy not measured because of reflection.

DETAILED DESCRIPTION OF THE INVENTION

Figure 1:
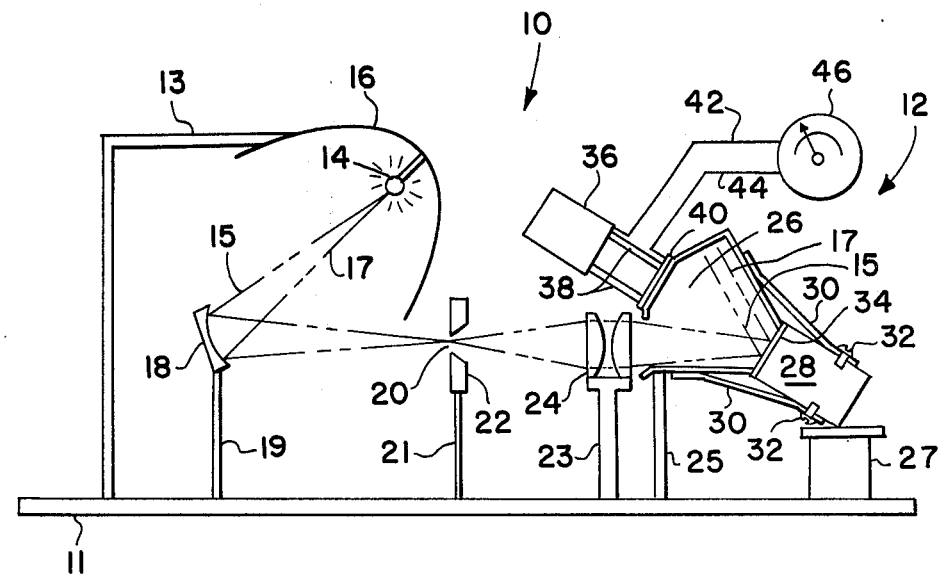
FIG. 1 is a schematic cross-section of the apparatus of the invention during measurement of the energy reflected from the detector.
Figure 2:
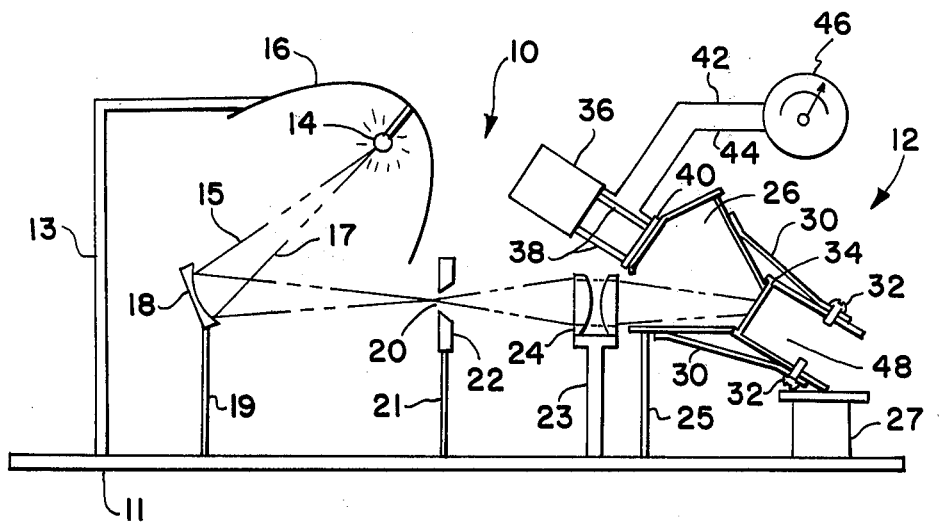
FIG. 2 is a schematic cross-section of the apparatus of the invention showing the cover substituted for the detector.

The preferred embodiment of the invention selected for illustration is shown in FIGS. 1 and 2 in which the same parts are assigned the same designations in both figures. The absorptivity measuring apparatus consists of an optical system shown generally at 10 and a cavity radiometer shown generally at 12, held in rigid alinement by base 11.

Optical system 10 includes a xenon lamp 14 attached to and partially enclosed by reflector 16. Reflector 16 is held rigid from base 11 by support 13. Ray 15 and 17 generated by xenon lamp 14 are focused by mirror 18, held by support 19 onto aperture 20 within disc 22. Disc 22 may be replaced from within its support 21 by other discs with apertures of various sizes to vary the size of the radiant image applied to radiometer 12.

The image of aperture 20 is focused by condensing lens assembly 24, kept in alinement by support 23, onto a surface within cavity 26, which is alined by support 25. In FIG. 1, radiation detector 28 is positioned and supported by block 27 so as to be the first surface upon which radiation entering cavity 26 impinges. Detector 28 is held tightly against cavity 26 at radiation tight seal 34 by straps 30 and screws 32 to prevent any radiation loss. Radiation which is not absorbed by detector 18 is reflected, as shown by rays 15 and 17, at such an angle that it subsequently impinges on the blackened surfaces of cavity 26. Each subsequent surface absorbs sizable portions of the radiation so that all the energy entering cavity 26 is finally absorbed either by detector 28 or the surfaces of cavity 26. Since all the radiation reflected from detector 28 is absorbed by cavity 26, the rise in temperature of cavity 26 is caused by the impinging radiation is a measure of energy reflected from detector 28. The thermal energy absorbed by cavity 26 is transferred to heat sink 36 via constantan rods 38. Constantan rods 38 are bonded to copper heat sink 36 and at the cavity end to copper plate 40 forming a differential copper-constantan thermocouple. The one dimensional flow of thermal energy produces a temperature difference at each junction thus producing an electrical voltage between leads 42 and 44 which is measured by millivoltmeter 46. This first reading of millivoltmeter 46 is proportional to the energy reflected from detector 28 and received by the surfaces of cavity 26.

In order to determine the total radiant energy to which detector 26 is subjected, thermally conducting cap 48 is substituted in the position of detector 28, and, supported by block 27, is held tightly against cavity 26 by straps 30 and screws 32 as shown in FIG. 2 and xenon lamp 14 is operated at exactly the same energy level as before. In this orientation radiant energy entering cavity 26 strikes conducting cap 48 rather than, as in the previous setup, detector 28. Some of the radiant energy is absorbed by cap 48 which causes heating of cap 48. This heat is conducted to the structure of cavity 26 with which cap 48 is in intimate thermal contact, through heat conductive and radiation tight joint 34 and ultimately, the heat raises the temperature of cavity 26. The energy reflected from cap 48 is absorbed by the surfaces of cavity 26 just as was the energy reflected from detector 28. Therefore, both the energy reflected and absorbed by cap 48 causes an increase in temperature of cavity 26 which is then converted to an electrical signal by the constantan copper junctions and read by millivoltmeter 46. The ratio of the millivoltmeter readings when detector 28 is in the apparatus to the millivoltmeter reading when cap 48 is in the apparatus is a measure of the reflectivity of the detector. The reflectivity ratio subtracted from one, yields a measure of the absorptivity of the detector.

Typical absorptivities secured by this method are: 0.85 for acetylene black on copper, 0.80 for oxidized copper, 0.33 for polished stainless steel, and 0.38 for polished copper.

It is understood that the form of the invention herein shown is merely a preferred embodiment. Various changes may be made in shape, size, and the arrangement of parts; equivalent means may be substituted for those illustrated and described; and certain features may be used independently from other features without departing from the spirit and scope of the invention as defined in the following claims. For example, the cavity may be of a different configuration or the method of energy measurement may be by calorimeter rather than thermocouple. Also, a different configuration of optical system may be used so long as the illumination of the detector meets the aforementioned criteria.

What is claimed as new and desired to be secured by Letters Patent of the United States is:

1. An apparatus for measuring the absorptivity of radiation detectors comprising:
   cavity radiometer means which converts the radiant energy into thermal energy, one inner surface of said cavity radiometer being a thermally conductive detachable cap, said detachable cap being that surface upon which radiant energy entering said cavity radiometer first impinges;
   heat conducting joint means attached to said cavity radiometer, joining said cavity radiometer with said detachable cap and preventing any leakage of radiant energy;
   attachment means holding said detachable cap tightly against said cavity radiometer and permitting the replacement of said detachable cap with a radiation detector to be measured for absorptivity;
   thermal energy measurement means attached to said cavity radiometer indicating the increase in thermal energy of said cavity radiometer due to absorbed radiation; and
   optical means for generating the radiant energy applied to said cavity radiometer.

2. An apparatus for measuring the absorptivity of radiation detectors as in claim 1 wherein the thermal energy measurement means is a thermocouple means connected to a voltage sensing means.

3. An apparatus for measuring the absorptivity of radiation detectors as in claim 2 wherein the thermocouple means is a differential copper-constantan thermocouple which generates an electrical voltage read by a millivoltmeter electrically connected to said copper-constantan thermocouple.

4. An apparatus for measuring the absorptivity of radiation detectors as in claim 1 wherein the internal surfaces of the cavity radiometer means are blackened to accomplish the conversion of radiant energy to thermal energy.

5. An apparatus for measuring the absorptivity of radiation detectors as in claim 1 wherein the optical means includes an aperture in the light path restricting the image of the radiant energy impinging upon the radiation detector to the size of the active area of the radiation detector.

6. An apparatus for measuring the absorptivity of radiation detectors as in claim 5 wherein the aperture is within a replaceable disc whereby the disc may be exchanged and the aperture size may be varied whereby the image of the radiant energy impinging upon the radiation detector may be adjusted to match the size of the active area of various detectors.

7. An apparatus for measuring the absorptivity of radiation detectors as in claim 1 wherein the optical means includes a radiation source which is a lamp.

8. An apparatus for measuring the absorptivity of radiation detectors as in claim 7 wherein the lamp is a xenon lamp.

9. An apparatus for measuring the absorptivity of radiation detectors as in claim 1 wherein the optical means includes a focusing means comprising a reflector attached to and partially enclosing the source means which directs the radiant energy into a narrow beam;
   a focusing mirror redirecting the radiant energy and further focusing the energy; and
   a condensing lens assembly finally focusing the energy onto the active surface of the radiation detector.

10. A method of measuring the absorptivity of a radiation detector which comprises:
   providing a cavity radiometer which absorbs radiant energy and converts it into thermal energy, one inner surface of which is removable;
   providing thermal measuring means which indicates the amount of radiant energy converted to thermal energy by said cavity radiometer;
   supplying focused radiant energy to said cavity radiometer so that it impinges only on said removable inner surface whereby said thermal measuring means indicates the total amount of radiation incident upon said removable inner surface;
   removing said removable inner surface and replacing it with a radiation detector which is to be measured for absorptivity;
   supplying the exact amount of focused radiant energy as previously to said cavity radiometer, so that it impinges only on the active area of the radiation detector substituted for said removable inner surface, whereby said thermal measuring means indicates the amount of radiation reflected from the radiation detector and together with the measurement of total incident radiant energy furnishes sufficient information to determine the absorptivity of the radiation detector.

* * * * *